(12) United States Patent
Reichinger et al.

(10) Patent No.: US 9,573,097 B2
(45) Date of Patent: Feb. 21, 2017

(54) AMMONIA OXIDATION CATALYST HAVING LOW $N_2O$ BY-PRODUCT FORMATION

(75) Inventors: Markus Reichinger, Munich (DE); Gerd Maletz, Bad Aibling (DE); Klaus Wanninger, Kolbermoor (DE); Andreas Bentele, Bad Aibling (DE); Martin Schneider, Pfinztal (DE)

(73) Assignee: CLARIANT PRODUKTE (Deutschland) GmbH, Frankfurt am Main (DE)

( * ) Notice: Subject to any disclaimer, the term of this patent is extended or adjusted under 35 U.S.C. 154(b) by 675 days.

(21) Appl. No.: 13/883,088

(22) PCT Filed: Oct. 28, 2011

(86) PCT No.: PCT/EP2011/068976
§ 371 (c)(1),
(2), (4) Date: Sep. 3, 2013

(87) PCT Pub. No.: WO2012/059423
PCT Pub. Date: May 10, 2012

(65) Prior Publication Data
US 2013/0343975 A1  Dec. 26, 2013

(30) Foreign Application Priority Data
Nov. 3, 2010  (DE) .................. 10 2010 050 312

(51) Int. Cl.
| | | |
|---|---|---|
| *B01D 53/94* | (2006.01) | |
| *B01J 35/04* | (2006.01) | |
| *B01J 23/00* | (2006.01) | |
| *B01J 23/652* | (2006.01) | |
| *B01J 37/02* | (2006.01) | |

(52) U.S. Cl.
CPC ....... *B01D 53/9413* (2013.01); *B01D 53/9404* (2013.01); *B01J 23/002* (2013.01); *B01J 23/6527* (2013.01); *B01J 35/04* (2013.01); *B01J 37/0201* (2013.01); *B01J 37/0205* (2013.01); *B01J 37/0228* (2013.01); *B01J 37/0242* (2013.01); *B01D 53/9477* (2013.01); *B01D 2255/1021* (2013.01); *B01D 2255/20776* (2013.01); *B01D 2255/407* (2013.01); *B01D 2257/406* (2013.01); *B01D 2258/012* (2013.01); *Y02C 20/10* (2013.01)

(58) Field of Classification Search
CPC  B01D 53/9413; B01D 53/9404; B01J 23/002; B01J 23/6527; B01J 35/04; B01J 37/0201; B01J 37/0205; B01J 37/0228; B01J 37/0242
See application file for complete search history.

(56) References Cited

U.S. PATENT DOCUMENTS

| | | | |
|---|---|---|---|
| 5,422,327 A | 6/1995 | Soled et al. | |
| 5,780,382 A | 7/1998 | Chang et al. | |
| 7,494,953 B2 | 2/2009 | Houzvicka et al. | |
| 2003/0069131 A1 | 4/2003 | Ying et al. | |
| 2003/0129099 A1 | 7/2003 | Zhang et al. | |
| 2006/0039843 A1 | 2/2006 | Patchett et al. | |
| 2008/0038174 A1 | 2/2008 | Mori et al. | |
| 2008/0286184 A1 | 11/2008 | Ando et al. | |
| 2008/0292519 A1 | 11/2008 | Caudle et al. | |
| 2009/0264286 A1 * | 10/2009 | Takeshima et al. | 502/325 |
| 2010/0034717 A1 * | 2/2010 | Adelmann | B01D 53/9418 423/213.2 |
| 2010/0111791 A1 * | 5/2010 | Caudle | 423/213.5 |
| 2011/0257007 A1 | 10/2011 | Khurshid et al. | |

FOREIGN PATENT DOCUMENTS

| | | | |
|---|---|---|---|
| DE | 69309189 | 6/1997 | |
| DE | 69420849 | 4/2000 | |
| EP | 0410440 | 1/1991 | |
| EP | 0544282 | 6/1993 | |
| EP | 1264628 | 12/2002 | |
| WO | WO 02/092224 | 11/2002 | |
| WO | WO 2008/136529 | 11/2008 | |
| WO | WO 2009/103406 | 8/2009 | |
| WO | WO-2009/103406 A1 * | 8/2009 | ............. B01D 53/94 |

OTHER PUBLICATIONS

Zhu et al (Characteristics of Pt/WO3/CeO2/ZrO2 catalysts for catalytic reduction of NO By CO, Applied Catalysis B: Environmental 86 (2009) 87-92).*
Hua, et al., Applied Catalysis A: General, 232, 2002, 129-135.
International Search Report for PCT/EP2011/068976, 2012.
Zhu, H.O., et al. "Characteristics of Pt/WO3/Ce02/Zr02 catalysts for catalytic reduction of NO by CO" Applied Catalysis B. Bd. 86, Nr. 1-2, Feb. 2, 2009.

* cited by examiner

*Primary Examiner* — Melvin C Mayes
*Assistant Examiner* — Michael Forrest
(74) *Attorney, Agent, or Firm* — Hueschen and Sage

(57) ABSTRACT

The present invention relates to a catalytic composition comprising a noble metal on an acidic tungsten-containing mixed oxide, a method for producing the catalytic composition and the use of the catalytic composition as oxidation catalyst. The invention further relates to a catalyst shaped body, which has the catalytic composition on a support, a washcoat containing the catalytic composition according to the invention and the use of the washcoat to produce a coated catalyst shaped body.

5 Claims, 2 Drawing Sheets

AMMONIA OXIDATION CATALYST HAVING LOW $N_2O$ BY-PRODUCT FORMATION

Figure 1:
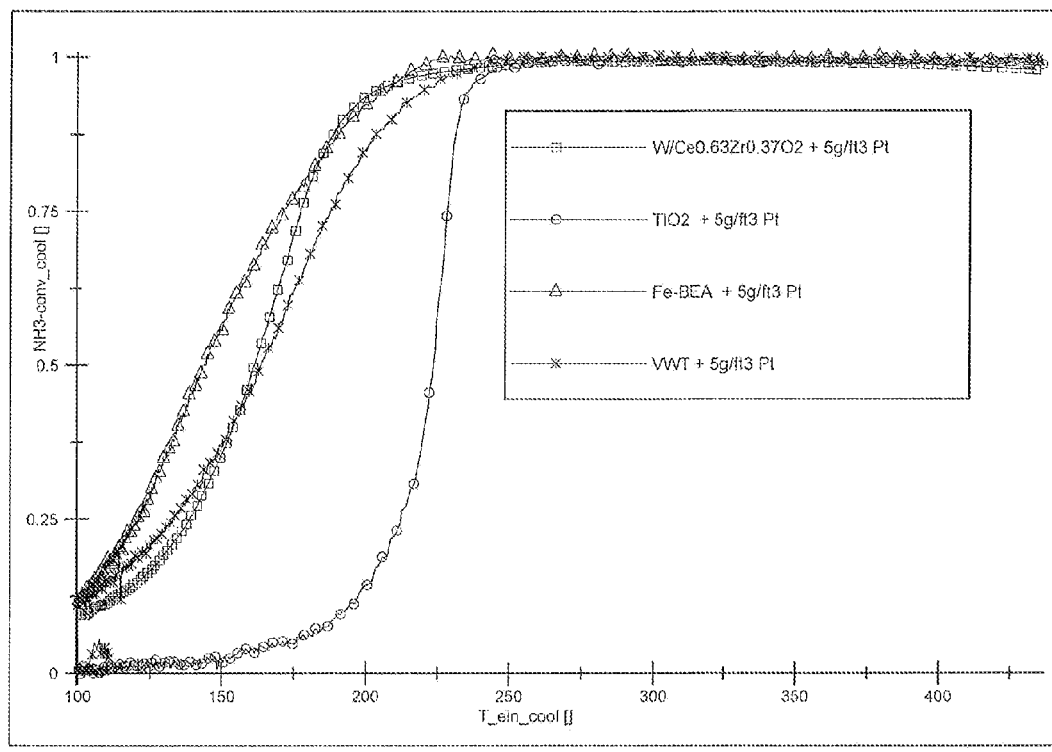

The present invention relates to a catalytic composition comprising a noble metal on an acidic tungsten-containing mixed oxide, a method for producing the catalytic composition and the use of the catalytic composition as oxidation catalyst. The invention further relates to a catalyst shaped body, which has the catalytic composition on a support, a washcoat containing the catalytic composition according to the invention and the use of the washcoat to produce a coated catalyst shaped body.

In order to achieve a large decrease in $NO_x$ emissions from diesel engines, for some years a so-called selective catalytic reduction (SCR) with urea has been used for exhaust gas post-treatment. Usually a urea solution is atomized into the exhaust gas stream. The urea is hydrolysed to ammonia and the ammonia released reacts in a comproportionation with nitrogen oxides to nitrogen.

The use of SCR allows engines to be optimized for very lean combustion. Although this leads to high nitrogen oxide emissions from the engine, which are then removed by SCR, a not inconsiderable fuel saving is made possible. However, there is the disadvantage that ammonia is perceptible as odour already at a concentration of more than 20 ppm. This means that under all, including dynamic, operating conditions, ammonia emissions of <20 ppm are required. For this, the completeness of the ammonia conversion in SCR must be very high. This cannot always be guaranteed. Thus, to prevent so-called ammonia slip, in addition a so-called ammonia oxidation catalyst (=slip catalyst=ASC=AMOX) can be incorporated after SCR. The oxidation of the ammonia takes place very rapidly and therefore this reaction can be used to prevent residual emissions of ammonia after SCR. It is, however, important that the catalyst has a high selectivity for $N_2$ and produces little NO, $NO_2$ and $N_2O$ (nitrous oxide). These relationships and requirements are described in a review in SAE 2006-01-0640.

Although there is no legal limit on $N_2O$ as by-product, low $N_2O$ emissions are nevertheless important, since $N_2O$ is one of the greenhouse gases and therefore has a climate-damaging action. Nitrous oxide is classified with a GWP (global warming potential) of 310, i.e. the amount of nitrous oxide in the atmosphere is, with respect to global warming, 310 times more harmful than the same amount of $CO_2$. Unfortunately precisely the currently usual platinum-containing catalysts, which have a high activity for oxidation, including of ammonia, have a high tendency to form $N_2O$.

The post-treatment of an exhaust gas after SCR by means of an ammonia oxidation catalyst has also already been used for a long time in exhaust gas post-treatment in stationary installations, such as for example power stations. V/W/Ti-based SCR catalysts are usually used in these stationary installations. It was found early on that the selectivity of these ammonia oxidation catalysts can be increased by combining them with an SCR catalyst directly. This means that the noble metal catalyst is not simply arranged only after the SCR catalyst, but at the same time the SCR function is still present in the oxidation catalyst zone. NO and $N_2O$ formed on the noble metal catalyst can then be converted selectively to $N_2$ again with ammonia that is still present.

EP 410440 B1 discloses a V/W/Ti full type extrudate SCR catalyst, which is coated with a noble metal in its outlet zone.

In EP 544282 B1, a catalyst is disclosed which has a combination of a V/W/Ti catalyst and platinum on a zeolite, or platinum on aluminium oxide or platinum on $SiO_2$. A very low platinum concentration is used here. It is shown in this document that a pure Pt/mordenite catalyst without V/W/Ti component (see comparison example 2) displays a negative $NO_x$ conversion, thus partly re-oxidizes ammonia to $NO_x$, whereas a pure V/W/Ti catalyst has a high ammonia slip. Only the combination of both catalysts shows both a high selectivity for $N_2$ and a low ammonia slip.

EP 1 399 246 B1 discloses a monolithic catalyst with a V/W/Ti-based SCR component, which is impregnated with platinum on its outlet side. The catalytically active material of the reduction catalyst (VWT-SCR) is the support for the platinum group metal. Here, the platinum is thus applied directly to the V/W/Ti catalyst, rather than two catalysts being mixed as in EP 544282 B1.

U.S. Pat. No. 7,393,511 B2 discloses a method for removing ammonia from exhaust gases, wherein ammonia is added to the gas and after SCR the gas is directed over an oxidation catalyst which comprises a noble metal and vanadium on a $TiO_2$ or $Al_2O_3$, $SiO_2$, $ZrO_2$, Al—Si oxide, MgO, $HfO_2$ or $La_2O_3$ support. It is therefore also a catalyst as described in EP 544282 or EP 1 399 246.

The basic idea behind all these catalysts is a combination of a first component with activity for the reduction of nitrogen oxides with ammonia and a second component with activity for forming nitrogen oxides from ammonia (for example via a noble metal).

Cu- and Fe-zeolites are also suitable for the reduction of nitrogen oxides with ammonia. Therefore in the state of the art it was also obvious to combine these zeolites with noble metal catalysts, in order to obtain an ammonia slip catalyst. These slip catalysts are described for example in U.S. Pat. No. 7,722,845 B2. Both the combination of a zeolite-SCR catalyst with Pt/Siralox and Pt directly on an Fe-BEA zeolite are described.

More recently, it has also been reported that acidic tungsten-containing oxides are also suitable for the SCR reaction. W/Ce/Zr mixed oxides are particularly preferred for this (see SAE 2007-01-0238, WO 2009/001131 and US 2010/0034717).

EP 7597865 also discloses the use of similar acidic Ce/Zr/Ti-sulphate catalysts or Ti/Zr/Ce/W-SCR catalysts followed by a slip catalyst which comprises platinum on an Si/Al oxide.

All the above-named noble metal-based oxidation catalysts oxidize ammonia both to $NO_x$ and to $N_2O$. These oxidation reactions are very rapid. However, the aim of the ammonia oxidation in the slip catalyst is oxidation to nitrogen. The reaction of the over-oxidized components $NO_x$ and $N_2O$ with the SCR catalyst is then slower and not uniform for $NO_x$ and $N_2O$. It is therefore difficult to keep both the $NO_x$ re-formation in this catalyst and the $N_2O$ emissions low. It is not possible according to the current state of the art to control this and specifically also in this case to ensure low $N_2O$ emissions.

The object of the present invention was therefore to provide a catalytic composition that is suitable as ammonia oxidation catalyst and has a particularly high selectivity for ammonia oxidation.

For this, the invention provides a catalytic composition comprising a noble metal on an acidic tungsten-containing mixed oxide.

It was surprisingly found that a catalytic composition which contains a noble metal on an acidic tungsten-containing mixed oxide has a particularly high selectivity for ammonia oxidation and only forms $N_2O$ at higher temperature, and generally causes less $N_2O$ emission.

According to one embodiment of the invention, the acidic tungsten-containing mixed oxide is preferably a Ce/Zr/W mixed oxide, a Y-stabilized Zr/W mixed oxide (Y/Zr/W mixed oxide) or a Ce/Zr/Ti/W mixed oxide, particularly preferably a Ce/Zr/W mixed oxide or consists only of the named mixed oxides. Combinations of the named mixed oxides are also possible. The mixed oxide preferably has a tungsten content of from 5 to 15 wt.-%, more preferably 5.5 to 10 wt.-% and most preferably 6 to 7 wt.-% tungsten, relative to the total mixed oxide.

According to a further embodiment of the present invention, the noble metal is preferably platinum. The mixed oxide preferably has 0.05 to 1 wt.-% platinum, more preferably 0.06 to 0.75 wt.-% platinum and most preferably 0.07 to 0.5 wt.-% platinum, relative to the total mixed oxide. Preferably, no other noble metal besides platinum is present in the catalytic composition.

The Ce/Zr ratio in the acidic tungsten-containing mixed oxide is preferably in the range of from 80:20 to 50:50, more preferably 60:40 to 70:30, still more preferably 65:35. As a result, a precisely adjusted acidic character of the mixed oxide is obtained, which contributes to the increase in selectivity.

Another subject of the invention is a method for producing the catalytic composition described above, comprising the steps of:
a) impregnating an acidic mixed oxide with a tungsten precursor compound;
b) calcining the impregnated mixed oxide;
c) impregnating the calcined mixed oxide from step b) with a noble metal precursor compound;
d) calcining the mixed oxide, impregnated with the noble metal precursor compound, from step c).

The mixed oxide used, for example a Ce/Zr mixed oxide used according to the invention, and also the W-containing mixed oxide produced preferably have a BET surface area of 20-250 $m^2/g$, preferably 40-100 $m^2/g$, most preferably 50-80 $m^2/g$. The BET surface area is determined according to DIN 66132 (using the method of Brunauer, Emmett and Teller).

In principle any tungsten compound that is converted to the corresponding oxide under the action of temperature in the calcining operation is suitable as tungsten precursor compound, preferably ammonium metatungstate $(NH_4)_6H_2W_{12}O_{40}$, ammonium tungstate $(NH_4)_{19}H_2(W_2O_7)_6$ and tungstic acid $H_2WO_4$. Particularly preferably, ammonium metatungstate is used as tungsten precursor compound.

The impregnation of the acidic mixed oxide with the tungsten precursor compound is followed by a calcining step, preferably at a temperature of from 400 to 800° C., more preferably 500 to 600° C., most preferably at about 550° C. As a result, the acidic tungsten-containing mixed oxide, which is preferably a ternary mixed oxide, forms.

The calcined mixed oxide is then impregnated with a noble metal precursor compound. The impregnation is preferably carried out by the incipient-wetness method, wherein however other methods, e.g. dipping methods, spraying methods and the like, can also be used.

The following, for example, are suitable as noble metal precursor compound: ethanolammonium hexahydroxoplatinate, hexachloroplatinic acid, tetrachloroplatinic acid, dinitro diamine platinate(II), tetraamine platinum(II) chloride, ammonium tetrachloroplatinate(II), ammonium hexachloroplatinate(IV), platinum-ethylenediamine-dichloride, tetraamine platinum(II) nitrate, tetraamine platinum(II) hydroxide, methylethanolamine-platinum(II) hydroxide and platinum nitrate, wherein ethanolammonium hexahydroxoplatinate is the most preferred.

The impregnation of the calcined mixed oxide with the noble metal precursor compound is again followed by a calcining step, preferably at a temperature between 400 and 800° C., more preferably between 500 and 600° C., most preferably at about 550° C., as a result of which finely divided noble metal is preferably deposited on the mixed oxide. The particle size of the deposited noble metal (preferably platinum) is preferably in the range of from 1 to 20 nm, particularly preferably in the range of from 3 to 17 nm. The particle size can be determined by transmission electron microscopy (TEM). The calcining can optionally also be preceded by a drying step, for example at temperatures of from 50 to 200° C., preferably 80 to 150° C.

As an alternative to the method given above, following production of the mixed oxide, this can first be applied to a suitable support, for example in the form of a washcoat, and only afterwards impregnated with the platinum compound. If the impregnation is only carried out in areas at one end of the support, this gives a combined SCR catalyst with ammonia slip prevention effect.

A further subject of the invention is the use of the catalytic composition, as described above or as produced according to the method described above, as oxidation catalyst, in particular as ammonia oxidation catalyst.

The catalytic composition is preferably used together with an SCR catalyst. The SCR catalyst is preferably arranged in the direction of flow before the catalytic composition according to the invention. The catalytic composition (oxidation catalyst) and the SCR catalyst can be arranged in a single catalyst component, for example by applying, in the direction of flow, first an SCR-active component and then the catalytic composition according to the invention to a suitable support, or the SCR-active component and the composition according to the invention can be housed in two separate components on separate supports.

The SCR catalyst can for example be an SCR-active component based on a Ce/Zr/W mixed oxide. However, any other SCR-active component within the meaning of this invention can also be used, for example the systems named at the outset and known in the state of the art.

The catalytic composition can be processed into a washcoat, wherein usually a solvent, for example water, and preferably also a binder are added. The washcoat is suitable for producing a coated catalyst shaped body.

Another subject is accordingly a catalyst shaped body containing a support and the catalytic composition as described above. Preferably the catalytic composition is applied at least in areas as coating on the support, more preferably the coating is applied to the whole surface of the support. The coating techniques required are known to a person skilled in the art. Thus, for example, the catalytic composition is processed into an aqueous coating dispersion. Silica sol, for example, can be added as binder to this dispersion. The viscosity of the dispersion can be adjusted with suitable additives, with the result that it becomes possible to apply the required amount of coating for example in a single operation to the walls of flow channels. If this is not possible, the coating can be repeated several times, wherein the freshly applied coating is fixed in each case by an intermediate drying. The finished coating is then dried at increased temperature and calcined for a period of from 1 to 4 hours at temperatures between 300 and 600° C.

The catalytic composition can also be processed, accompanied by addition of suitable excipients such as inorganic binders (e.g. silica sol), pore formers, plasticizers and moistening agents, in known manner into shaped bodies such as tablets and extrudates. Preferably, however, the catalytic composition is applied in the form of a coating (as washcoat) to the inside walls of the flow channels of metallic or ceramic honeycomb bodies (monoliths).

Therefore the support is preferably a metallic or ceramic support, more preferably a so-called monolithic support, which has a large number of parallel passage openings and therefore a large surface area. The support material is preferably either a ceramic such as for example cordierite or a metal or an alloy (from Emitec). In addition for example metal foams (from Inco) can be used as supports.

Usually the catalyst shaped body is incorporated into a housing, which has an inlet and outlet opening for an exhaust gas that is to be purified.

Another subject of the invention is therefore a catalyst component, containing the catalyst shaped body according to the invention. The catalyst component can be part of an exhaust gas cleaning system, which preferably has further components, e.g. a particle filter, an upstream oxidation catalyst, a urea hydrolysis catalyst, an SCR catalyst and the like.

The invention will now be explained in more detail with reference to some embodiment examples, wherein however the content thereof is not to be understood as limiting the scope of the present invention. In addition, reference is made to FIGS. 1 to 3.

There are shown in:

FIG. 1 the ammonia conversion of the compound according to the invention in comparison with compounds not according to the invention. The ammonia light-off temperature can be determined using this diagram.

Figure 2:
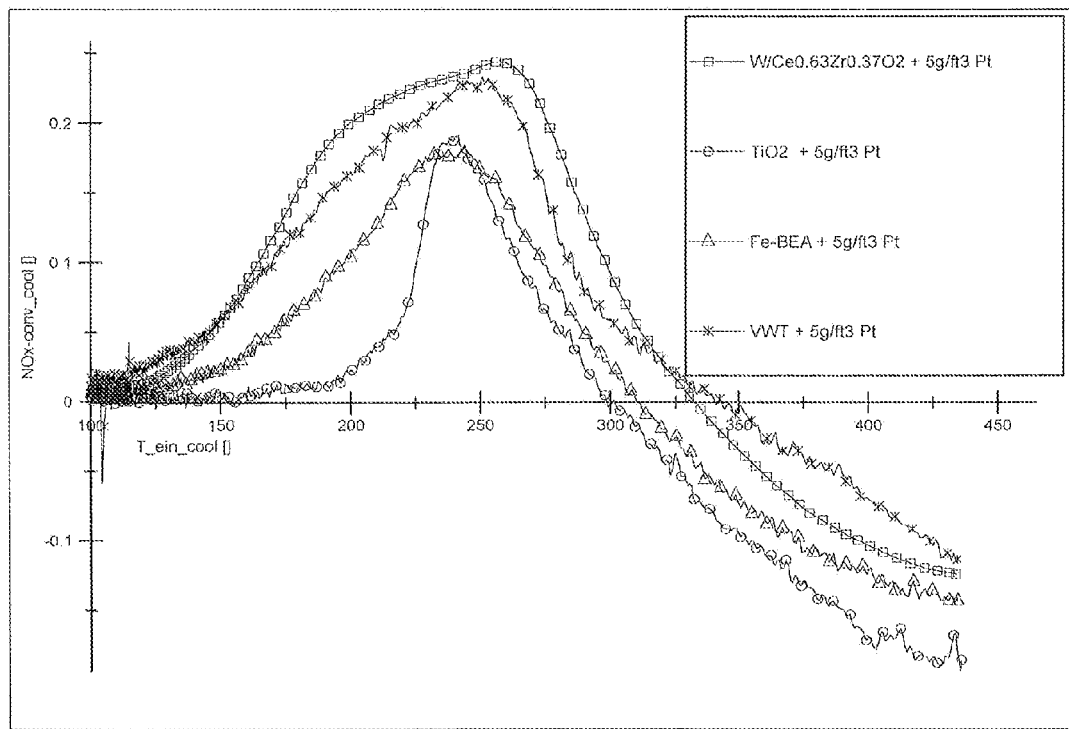

FIG. 2 the $NO_x$ conversion of the compound according to the invention in comparison with compounds not according to the invention.

Figure 3:
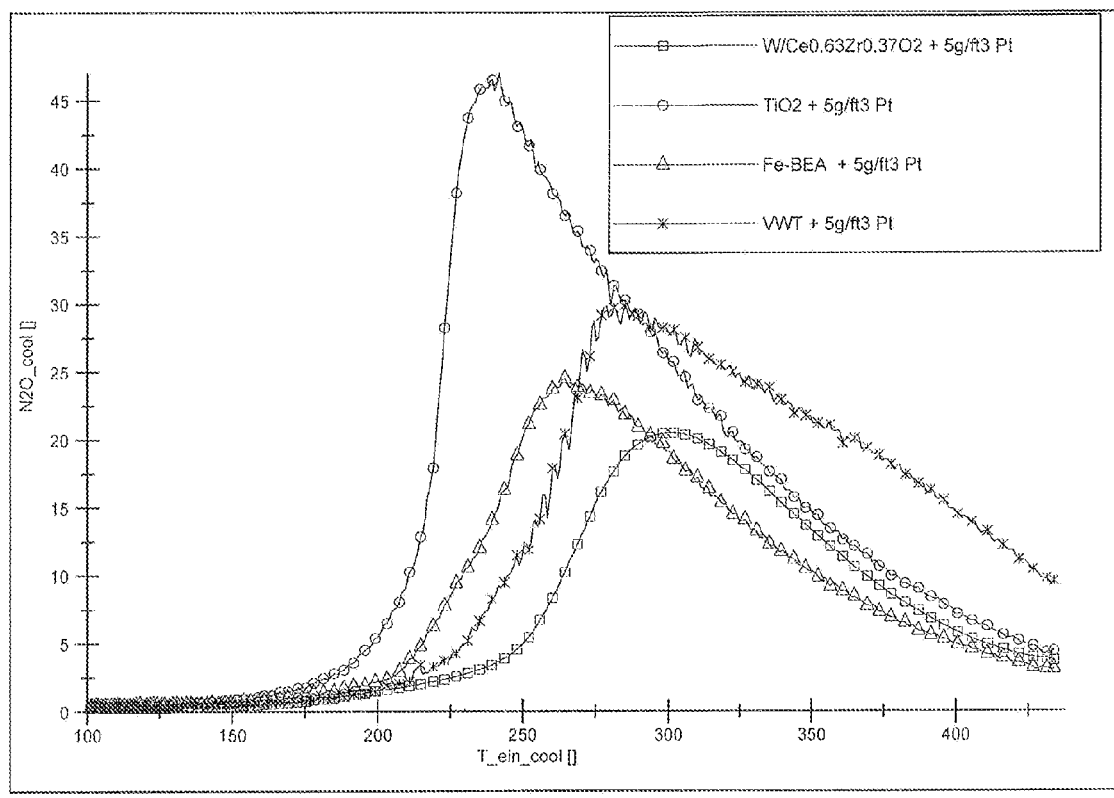

FIG. 3 the $N_2O$ outlet concentration in ppm of the compound according to the invention in comparison with compounds not according to the invention.

EMBODIMENT EXAMPLES

The invention is illustrated using Example 1 and the comparison examples. All of the following catalysts have 5 g/ft$^3$ platinum (0.1766 g platinum/1 L honeycomb=0.1766 g platinum/250 g Ce/Zr/W oxide=0.0706%) on the respective honeycombs. The honeycombs all have 1" diameter and 2" length.

In the example, the catalyst according to the invention is produced by coating a honeycomb with a W/Ce/Zr oxide, followed by Pt-impregnation. In comparison example 1 a catalyst based on Pt/titanium dioxide is produced, a catalyst without SCR properties. In comparison example 2 a catalyst with Pt on an Fe-BEA zeolite is produced, and in comparison example 3 a catalyst based on Pt on a V/W/Ti-SCR catalyst is produced. The comparative test is described in Example 4.

Example 1

381 g of a Ce/Zr mixed oxide (Ce/Zr=63:36) is impregnated with a solution of 37.5 g ammonium metatungstate in 190 mL of deionized water to 6.1% W content and calcined at 550° C. A washcoat is produced from this powder and a ceramic honeycomb is coated in several steps to 250 g/l washcoat loading (dry) and calcined at 550° C. Each coating step is followed by drying and calcining. (Honeycombs of 1" diameter and 2" length were coated, V=25.3 ml coated with 6.425 g washcoat.)

Then the water absorption of the honeycomb is determined and the latter is dried again.

A platinum-ethanolamine solution (ethanolammonium hexahydroxoplatinate) with 13.1% platinum content is diluted. There should be 5 g platinum/ft$^3$ honeycomb volume of noble metal on the honeycomb (5 g/ft$^3$=0.1766 g/l). This means that a platinum solution must be produced in which 0.00447 g platinum is contained in the volume of water absorbed. The honeycomb is then immersed completely for 10 s in a platinum-ethanolamine solution of this concentration, and in this way impregnated via "incipient wetness". The honeycomb is dried and calcined at 550° C.

Comparison Example 1

A washcoat is produced from 20 kg titanium dioxide DT 51D from Millennium and 26 kg titanium dioxide sol (12%, stabilized with nitric acid) from Sachtleben as binder. A honeycomb is coated to 32 g/l washcoat and calcined at 450° C.

Then the water absorption of the honeycomb is determined and the latter is dried again.

A platinum-ethanolamine solution (ethanolammonium hexahydroxoplatinate) with 13.1% platinum content is diluted. There should be 5 g platinum/ft$^3$ honeycomb volume of noble metal on the honeycomb (5 g/ft$^3$=0.1766 g/l). This means that a platinum solution must be produced in which 0.00447 g platinum is contained in the volume of water absorbed. The honeycomb is then completely immersed for 10 s in a platinum-ethanolamine solution of this concentration, and in this way impregnated via "incipient wetness". The honeycomb is dried and calcined at 550° C.

Comparison Example 2

A washcoat is produced from Fe-BEA zeolite, to which a colloidal silica sol is added as binder. A ceramic honeycomb is coated to 250 g/l washcoat and calcined at 550° C.

Then the water absorption of the honeycomb is determined and the latter is dried again.

A platinum-ethanolamine solution (ethanolammonium hexahydroxoplatinate) with 13.1% platinum content is diluted. There should be 5 g platinum/ft$^3$ honeycomb volume of noble metal on the honeycomb (5 g/ft$^3$=0.1766 g/l). This means that a platinum solution must be produced in which 0.00447 g platinum is contained in the volume of water absorbed. The honeycomb is then completely immersed for 10 s in a platinum-ethanolamine solution of this concentration, and in this way impregnated via "incipient wetness". The honeycomb is dried and calcined at 550° C.

Comparison Example 3

A washcoat is produced from W-stabilized titanium dioxide DT 52 and 2.5% $V_2O_5$. A ceramic honeycomb is coated to 200 g/l washcoat and calcined at 450° C.

Then the water absorption of the honeycomb is determined and the latter is dried again.

A platinum-ethanolamine solution (ethanolammonium hexahydroxoplatinate) with 13.1% platinum content is diluted. There should be 5 g platinum/ft$^3$ honeycomb volume of noble metal on the honeycomb (5 g/ft$^3$=0.1766 g/l). This means that a platinum solution must be produced in which 0.00447 g platinum is contained in the volume of water absorbed. The honeycomb is then completely immersed for 10 s in a platinum-ethanolamine solution of this concentration, and in this way impregnated via "incipient wetness". The honeycomb is dried and calcined at 450° C.

Example 4

The catalysts were tested in a tubular glass reactor (inside diameter 27 mm) under the following conditions:
250 ppm NO
50 ppm $NH_3$
5% $O_2$
5% $CO_2$
5% $H_2O$
Remainder $N_2$
Space velocity=84,000 $h^{-1}$
Measurement with cooling from 420° C. to 100° C.

FIG. 1 shows the ammonia conversion versus the temperature. The ammonia light-off temperature can be determined from this (temperature at 50% conversion).

It can be seen that here, although the Pt catalyst on the Fe-BEA zeolite (comparison example 2) is the best, the other two (VWT and the catalyst according to the invention) are not substantially poorer. Bearing in mind the fact that at least 200° C. is required to produce ammonia from the urea solution, it can be seen here that all catalysts, except the catalyst that does not contain an SCR component ($TiO_2$, comparison example 1), fulfil this requirement.

FIG. 2 shows the $NO_x$ conversion in this test. A negative $NO_x$ conversion means that additional $NO_x$ is formed from the ammonia by ammonia oxidation. At low temperature the reaction is selective, because here the SCR function predominates. With increasing temperature, the oxidation becomes so rapid that more ammonia is oxidized immediately, before it can react selectively with the $NO_x$ in the SCR. The higher this temperature at which this negative $NO_x$ conversion, thus more ammonia oxidation to $NO_x$, takes place, the better the catalyst. It can clearly be seen that the catalyst according to the invention (squares) and the VWT catalyst (comparison example 3, stars) are the best.

However, the decisive advantage of the catalyst according to the invention over the entire state of the art can clearly be seen in FIG. 3. FIG. 3 shows the $N_2O$ outlet concentration in ppm. $N_2O$ is an undesired by-product. It can clearly be seen that the catalyst according to the invention (squares) only exceeds 5 ppm $N_2O$ at 250° C., thus $N_2O$ only forms at higher temperature, and, with a maximum of 20 ppm at 300° C., also has the lowest $N_2O$ formation.

The invention claimed is:

1. A process for treating an exhaust gas, comprising the step of contacting the exhaust gas with an oxidation catalyst comprising a catalytic composition comprising a noble metal on an acidic tungsten-containing mixed oxide, wherein the acidic tungsten-containing mixed oxide is a Ce/Zr/W mixed oxide and wherein the mixed oxide has a tungsten content of from 5 to 10 wt.-%, relative to the total mixed oxide, wherein the exhaust gas is contacted with an SCR catalyst upstream of the oxidation catalyst, and wherein the oxidation catalyst provides a high selectivity for ammonia oxidation.

2. The process according to claim 1, wherein the SCR catalyst and the oxidation catalyst are present on a common support.

3. The process according to claim 1, wherein the noble metal is platinum.

4. The process according to claim 1, wherein the mixed oxide has 0.05 to 1.0 wt.-% platinum, relative to the total mixed oxide.

5. The process according to claim 1, wherein the Ce/Zr ratio is 80:20 to 50:50.

* * * * *